United States Patent
Takaoka et al.

(10) Patent No.: US 8,307,019 B2
(45) Date of Patent: *Nov. 6, 2012

(54) FILE MANAGEMENT METHOD AND STORAGE SYSTEM

(75) Inventors: Nobumitsu Takaoka, Sagamihara (JP); Masaaki Iwasaki, Tachikawa (JP); Takaki Nakamura, Ebina (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/348,292

(22) Filed: Jan. 11, 2012

(65) Prior Publication Data

US 2012/0110045 A1    May 3, 2012

Related U.S. Application Data

(63) Continuation of application No. 12/622,963, filed on Nov. 20, 2009, now Pat. No. 8,112,463.

(30) Foreign Application Priority Data

Sep. 16, 2009   (JP) ................. 2009-214007

(51) Int. Cl.
*G06F 17/30* (2006.01)
(52) U.S. Cl. .............. 707/827; 707/822; 707/E17.01
(58) Field of Classification Search .......... 707/827, 707/821, E17.01
See application file for complete search history.

(56) References Cited

U.S. PATENT DOCUMENTS

| | | |
|---|---|---|
| 6,182,088 B1 | 1/2001 | Kawakami et al. |
| 6,704,730 B2 | 3/2004 | Moulton et al. |
| 7,380,093 B2 | 5/2008 | Shimazaki et al. |
| 2001/0037323 A1 | 11/2001 | Moulton et al. |
| 2009/0083344 A1 | 3/2009 | Inoue et al. |
| 2009/0157948 A1 | 6/2009 | Trichina et al. |

FOREIGN PATENT DOCUMENTS

EP   0 629 961 B1   3/2003

OTHER PUBLICATIONS

Bassi et al., Mobile Management of Network Files, IEEE, 2002, pp. 106-114.

Premerlani et al., An Approach for Reverse Engineering of Relational Databases, IEEE, 1993, pp. 151-160.

*Primary Examiner* — Fred I Ehichioya
*Assistant Examiner* — Shiow-Jy Fan
(74) *Attorney, Agent, or Firm* — Foley & Lardner LLP

(57) ABSTRACT

Files stored in a storage system are grouped in a metadata server, and storage servers discretely storing these files are instructed to detect file duplication and to remove duplicate data. The storage servers detect duplicate data by comparing file fragments stored by the storage servers themselves with each other. In a case where duplicate data is detected, the storage servers delete the duplicate data.

13 Claims, 15 Drawing Sheets

FIG. 3

121 STORAGE SERVER MANAGEMENT TABLE

| STORAGE SERVER IDENTIFICATION INFORMATION (1211) | IP ADDRESS (1212) |
|---|---|
| A | 10.0.0.1<br>10.0.1.1 |
| B | 10.0.0.2<br>10.0.1.2 |
| ・・・・・ | ・・・・・ |
| L | 10.0.0.12<br>10.0.1.12 |

FIG. 4

122 LAYOUT TABLE

| DISTRIBUTED-FILE IDENTIFICATION NUMBER (1221) | FILE FRAGMENT NUMBER (1222) | STORAGE SERVER (1223) | FILE FRAGMENT IDENTIFICATION INFORMATION (1224) |
|---|---|---|---|
| 110 | 1 | A | 1100 |
| 110 | 2 | B | 1200 |
| 110 | 3 | C | 1300 |
| 220 | 1 | D | 2100 |
| 220 | 2 | E | 2200 |
| 220 | 3 | F | 2300 |
| 330 | 1 | G | 3100 |
| 330 | 2 | H | 3200 |
| 330 | 3 | I | 3300 |
| 440 | 1 | J | 4100 |
| 440 | 2 | K | 4200 |
| 440 | 3 | L | 4300 |
| ⋮ | ⋮ | ⋮ | ⋮ |

FIG. 5

123 DISTRIBUTED FILE ATTRIBUTE TABLE

| DISTRIBUTED-FILE IDENTIFICATION NUMBER | PATH NAME | LATEST UPDATE TIME | FILE SIZE | ATTRIBUTE | SUMMARY HASH |
|---|---|---|---|---|---|
| 110 | /dir01/file01 | 2009/07/02 10:01 | 3,414,336 | | 0x00f00001 |
| 220 | /dir01/file02 | 2009/06/29 11:02 | 3,414,336 | | 0x00f00001 |
| 330 | /dir02/file03 | 2009/03/20 15:03 | 3,414,336 | | 0x00f00001 |
| 440 | /dir04/file04 | 2009/06/14 20:04 | 3,414,336 | | 0x00f00001 |
| ⋮ | ⋮ | ⋮ | ⋮ | ⋮ | ⋮ |

124 SIMILAR GROUP TABLE

| GROUP IDENTIFICATION INFORMATION | DISTRIBUTED-FILE IDENTIFICATION NUMBER | GROUP FEATURE INFORMATION | TYPE |
|---|---|---|---|
| 1 | 110<br>220<br>330 | 0x00f00001 | SUMMARY HASH |
| 2 | 550<br>660<br>880 | 0x00700000 | SUMMARY HASH |
| ………… | ………… | ………… | ………… |

1241, 1242, 1243, 1244

FILE MANAGEMENT METHOD AND STORAGE SYSTEM

CROSS-REFERENCE TO RELATED PATENT APPLICATIONS

Japan Priority Application 2009-214007, filed Sep. 16, 2009 including the specification, drawings, claims and abstract, is incorporated herein by reference in its entirety. This application is a Continuation of U.S. application Ser. No. 12/622,963, filed Nov. 20, 2009, incorporated herein by reference in its entirety.

BACKGROUND

The present invention generally relates to a method for deleting duplicate data in a case where data is stored in duplicate in a distributed file system.

Technologies for a distributed file system in which files are discretely stored in a plurality of data storage servers have been developed. In the case of a storage system that adopts a distributed file system, data storage servers with a storage capacity can be added to the storage system. A storage capacity shortage or inadequate I/O performance can thus be easily rectified.

As an example of a distributed file system, mention may be made of Network File System (NFS) version 4.1 by the Internet Engineering Task Force (IETF). NFS version 4.1 includes the pNFS (Parallel NFS) specification, which is one distributed file system. In pNFS, the storage system includes a metadata server for centrally managing metadata for all the files and a plurality of storage servers for fragmenting file content and storing file fragments discretely. When a file is accessed, a computer serving as a client of the storage system first obtains, from the metadata server, information on which storage servers the desired file has been distributed to, and then accesses the appropriate storage servers on the basis of this information.

There also exists data deduplication technology. For example, US Patent No. 2001/0037323 discloses data deduplication technology that is suitable for long-term file storage. The storage system disclosed in US Patent No. 2001/0037323 comprises a plurality of data storage nodes. When files are stored in the storage system, the files are split into fragments and stored discretely in a plurality of nodes. A range of hash values for stored file fragments is predefined for each node. If a file fragment with a hash value identical to a hash value calculated from the file fragment has already been stored in a node, the node does not store the fragment. Data deduplication is thus possible because several files of the same content are not stored.

SUMMARY

As a result of increases in unstructured data (file data), enterprise information systems are confronted by the problem of increased storage procurement costs and higher operations management costs for backups and the like.

In a distributed file system, a storage capacity shortage and inadequate I/O performance can be rectified by adding nodes. Adding nodes increases the aforementioned costs, however.

By combining a distributed file system with data deduplication technology, a scalable and space-efficient storage system can be constructed, and a reduction in the above costs can be expected. However, the technology of US Patent No. 2001/0037323 cannot be applied to a distributed file system such as pNFS.

In the storage system disclosed in US Patent No. 2001/0037323, if a stored file fragment is modified, the hash value of the file fragment changes and the file fragment must therefore be relocated to an appropriate node. Hence, when the technology of US Patent No. 2001/0037323 is applied to a distributed file system such as pNFS, in which a client is capable of writing data directly to a file fragment stored in a storage server, the hash value of the file fragment must be recalculated each time data is written to a file, and data must be relocated, therefore leading to an increased load on the storage system and an inferior performance.

In order to solve the above problem, the storage system of the present invention includes a first file server having a first storage area, a second file server which is coupled to the first file server and which includes a second storage area, and one or more computers coupled to the first and second file servers. Furthermore, the computer splits a data array stored in one file into one or more fragment data arrays including a first fragment data array; the first file server stores a first fragment file storing the first fragment data array in the first storage area; the computer splits a data array stored in a second file into one or more fragment data arrays including a second fragment data array; and the second file server stores a second fragment file storing the second fragment data array in the second storage area; and the first file server, if the first fragment data array matches the second fragment data array, deletes the first fragment data array, and changes the first fragment file to a stub that indicates the second fragment data array.

A data deduplication method with a small load is provided in a distributed file system.

BRIEF DESCRIPTION OF THE DRAWINGS

FIG. 3 shows an example of a storage server management table 121;
FIG. 4 shows an example of a layout table 122;
FIG. 5 shows an example of a distributed file attribute table 123;
FIG. 6 shows an example of a similar group table 124.

DETAILED DESCRIPTION OF THE EMBODIMENT

Example 1

Embodiments of the present invention will be described with reference to the drawings. Note that the embodiments described hereinbelow do not limit the inventions according to the claims, and that all the elements and combinations thereof described in the embodiments are not necessarily indispensable as means for solving the invention.

First, an overview of a computer system according to an embodiment of the present invention will be described.
<FIG. 1: Overview>

Figure 1:
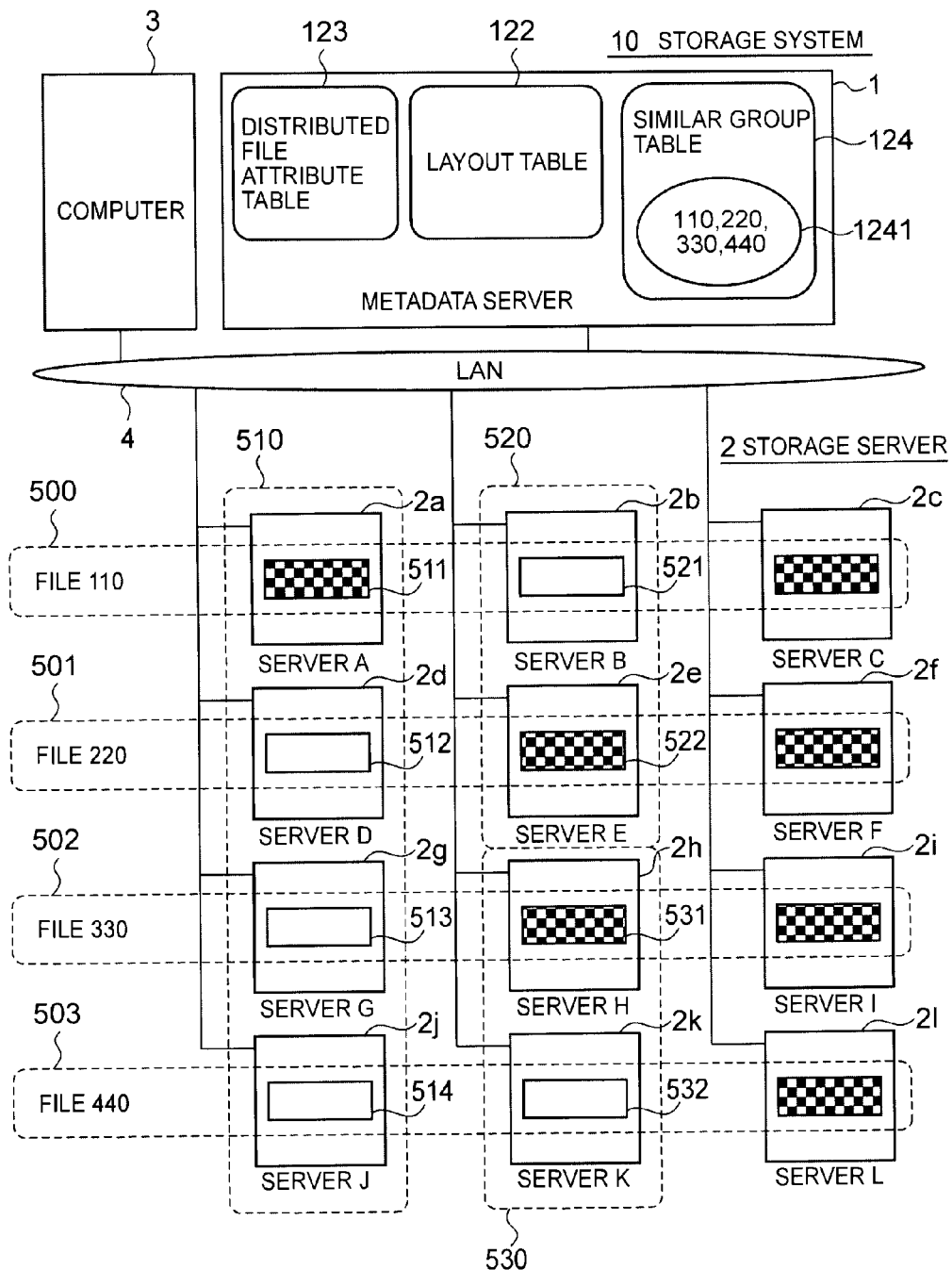
FIG. 1 provides an overview of a computer system.

FIG. 1 provides an overview of the computer system according to a first embodiment of the present invention.

The computer system of FIG. 1 comprises a storage system 10 including a metadata server 1 and a plurality of storage servers 2a to 2l, a computer 3, which reads and writes data from/to the storage system, and a LAN 4 that connects the storage system 10 and the computer 3.

To provide fault tolerance, there may also be a plurality of the metadata server 1. In this case, a variety of information that is stored in the memory of the metadata server 1 is shared between the plurality of metadata servers 1. For information-sharing means, a method that uses a shared disk or a method that utilizes a distribution commit algorithm or a consensus algorithm may be considered.

There may also be a plurality of the computer 3.

The metadata server 1, the storage server 2, and the computer 3 each communicate via the LAN 4. The network protocol used for communications is the Internet Protocol (IP). IP addresses are set for the server 1, the storage server 2, and the computer 3, and are used as information indicating communication partner addresses.

Note that a storage server representing any of the storage servers 2a to 2l will be denoted hereinafter by reference number "2".

When a desired file stored in the storage system 10 (files stored discretely in the storage system 10 will be referred to hereinafter as distributed files) is to be accessed, the computer 3 first obtains information, indicating which storage server 2 the desired distributed file is discretely stored in, from the metadata server 1. The computer 3 then accesses the appropriate storage server 2 on the basis of the information obtained, and accesses the desired address of the desired distributed file.

Distributed files are split into fixed sizes (sixteen kilobytes, for example) (data arrays obtained by splitting a distributed file will be called "file fragments" hereinafter), and stored in the storage server 2. Furthermore, a unique distributed-file identification number is set for each distributed file. The broken line area 500 indicates the fact that a distributed file with a distributed-file identification number 110 (hereinafter appears simply as "distributed file 110") is discretely stored across the storage server 2a, the storage server 2b, and the storage server 2c. The storage server 2a, the storage server 2b, and the storage server 2c respectively store file fragments 54a, 54b, and 54c of the distributed file 110. Broken line areas 501 to 503 similarly also indicate that distributed files 220, 330, and 440 respectively are discretely stored.

Information indicating how file fragments of distributed files are stored in the storage servers 2 will be referred to as the "layout" hereinbelow. The layout is recorded in a layout table 122 that is stored in the memory of the metadata server 1. Furthermore, attribute information such as the update time of each distributed file is stored in a distributed file attribute table 123 in the metadata server 1.

The layout of each distributed file is determined by the storage servers 2 on the basis of a round-robin system and on the basis of free capacity of each storage server 2.

In a case where the computer 3 initially stores a distributed file, the computer 3 first obtains the layout from the storage servers 2, splits the distributed file into file fragments based on the layout, and stores each file fragment in an appropriate storage server 2 according to the layout.

The flow of deduplication processing will be described hereinbelow.

The metadata server 1 refers to the distributed file attribute table 123, extracts distributed files that have not been updated for a fixed period, and registers distributed files confirmed as similar among these distributed files as a similar group in a similar group table 124. This processing may be performed by the metadata server 1 at regular intervals or may be performed while the load (CPU utilization) of the metadata server 1 is low. In FIG. 1, an aspect in which the distributed files 110, 220, 330, and 440 are registered as a similar group 1241 is shown.

If a group that includes a predetermined number (four, for example) of distributed files, such as the similar group 1241, is formed, the metadata server 1 instructs the storage servers 2 in which the distributed files are discretely stored to execute distributed-file deduplication processing.

The metadata server 1 first instructs storage servers 2a, 2d, 2g, and 2j, in which the leading file fragments of the distributed files 110, 220, 330, and 440 contained in the similar group 1241 are stored respectively, to perform distributed-file deduplication processing. After receiving the instruction, the storage servers 2a, 2d, 2g, and 2j calculate hash values for file fragments 511, 512, 513, and 514, which are respectively stored in the storage servers 2a, 2d, 2g, and 2j, compares these hash values with one another, and places storage servers with identical hash values in an identical-fragment group. In FIG. 1, it is shown that, as a result of comparing the hash values, the hash values of the file fragments 511 to 514 are identical, and therefore a single identical-fragment group 510 is formed.

One of the storage servers, in which a file fragment of the identical-fragment group is stored, is then selected according to a policy. While the file fragment stored in the selected storage server is retained, the file fragments in the other storage servers are deleted. In FIG. 1, an aspect is shown in which the file fragment of the storage server 2a of the identical-fragment group 510 has been retained (shown shaded in FIG. 1), while the file fragments of the remaining storage servers 2d, 2g, and 2j have been removed.

Thereafter, the storage servers 2a, 2d, 2g, and 2j likewise instruct the storage servers 2b, 2e, 2h, and 2k, which respectively store the next file fragments, to execute the deduplication processing. The storage servers 2b, 2e, 2h, and 2k perform the same processing as described earlier, and perform deduplication processing on the second file fragments of the distributed files. FIG. 1 shows that identical-fragment groups 520 and 530 are formed, while file fragments of the storage servers 2e and 2h still remain.

Thus, by using an appropriate method to specify a distributed file targeted for data deduplication, and then performing, without data relocation, distributed-file data deduplication through co-operation between the storage servers 2, data deduplication with a low processing load can be implemented even in a distributed file system. Furthermore, by performing detection of duplicate data through co-operation between the storage servers 2, a load concentration on a specific server can be avoided.

Figure 2:
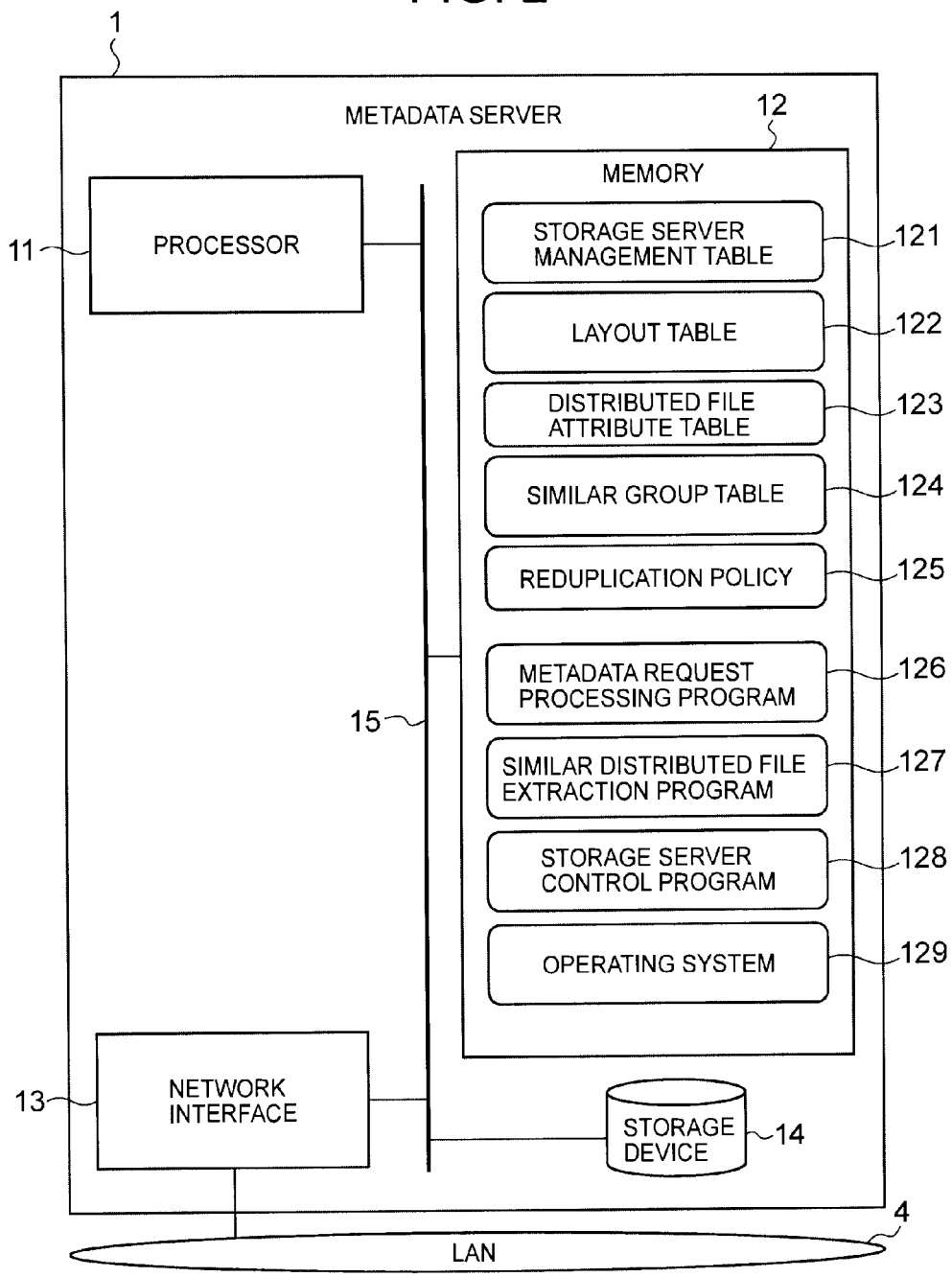
FIG. 2 shows an example of a metadata server 1.

<FIG. 2: Metadata Server>

FIG. 2 illustrates an example of the metadata server 1 according to the first embodiment of the present invention.

The metadata server 1 comprises a processor 11, a memory 12, a network interface 13, and a storage device 14. These parts are mutually connected by a bus 15.

The processor 11 executes various processing by using programs and data stored in the memory 12.

The network interface 13 controls inputs and outputs of data to and from the computer 3 and the storage servers 2 via the LAN 4.

The storage device 14 stores programs that are executed by the metadata server 1 and data used by the programs.

The memory 12 stores various data of the storage server management table 121, the layout table 122, the distributed file attribute table 123, the similar group table 124, and a deduplication policy 125. Furthermore, the memory 12 stores a metadata request processing program 126, a similar distributed file extraction program 127, a storage server control program 128, and various programs of an operating system 129. A metadata request-processing device, a similar distributed file extraction device, a storage server control device, and an operating system processing device are formed by the metadata server 1 as a result of these programs being executed by the processor 11. The programs and processing devices will be described subsequently without distinction.

<FIG. 3 Storage Server Management Table>

FIG. 3 shows an example of a storage server management table 121 according to the first embodiment of the present invention.

The storage server management table 121 stores records that have a storage server identification information field 1211 and an IP address field 1212. These records correspond to the storage servers 2a to 2l respectively, and store information relating to the corresponding storage servers 2.

The storage server identification information field 1211 of each record stores information identifying the corresponding storage server 2. The identification information of the storage server 2 is a unique name that is assigned to each storage server 2. In this embodiment, each storage server 2 is identified by a character of the alphabet. For example, the identification information of the storage server 2a is "A".

The IP address field 1212 of each record stores an IP address that has been set for the corresponding storage server 2. A plurality of IP addresses may also be set for each storage server 2.

As an example of the storage server management table, FIG. 3 shows that information relating to the storage server 2a is stored in a first record of the storage server management table 121, that identification information of the storage server 2a is "A", and that the IP addresses are 10.0.0.1 and 10.0.1.1.

<FIG. 4: Layout Table>

FIG. 4 shows an example of the layout table 122 according to the first embodiment of the present invention.

The layout table 122 stores records that have a distributed-file identification number field 1221, a file fragment number field 1222, a storage server field 1223, and a file-fragment identification information field 1224.

The records of the layout table 122 each correspond to a file fragment of a distributed file stored in the storage system 10, and store information relating to corresponding file fragments.

The distributed-file identification number field 1221 and the file fragment number field 1222 of each record respectively store the distributed-file identification number of a corresponding file fragment, and the order of the relevant file of the file fragment. The distributed-file identification number is an integer value that is uniquely assigned to each distributed file. In this embodiment, each distributed file is identified by the distributed-file identification number.

The storage server field 1223 of each record stores identification information of the storage server 2 in which the corresponding file fragment is stored.

The file-fragment identification information field 1224 of each record stores the identification number of a local file, in the storage server 2, in which the corresponding file fragment is stored. A local file refers to a file stored in a file system 26 that each storage server 2 comprises. The local file stored in the file system is identified by a unique identification number in the file system.

For example, in FIG. 4, the first to third records store information relating to file fragments of a distributed file with the distributed-file identification number 110. The distributed file 110 comprises three file fragments. Information on each file fragment is stored in the first to third records of the layout table 122. Referring to the first record, the first file fragment of the distributed file 110 is stored in a local file 1100 of the storage server 2a (identification information A). It is likewise shown that the second file fragment of the distributed file 110 is stored in a local file 1200 of the storage server 2b (identification information B), and the third file fragment of the distributed file 110 is stored in a local file 1300 of the storage server 2c (identification information C).

<FIG. 5: File Attribute Table>

FIG. 5 shows an example of the distributed file attribute table 123 according to the first embodiment of the present invention.

The distributed file attribute table 123 stores records that have a distributed-file identification number field 1231, a path name field 1232, a latest update time field 1233, a file size field 1234, an attribute field 1235, and a summary hash field 1236.

Each record corresponds to each distributed file stored in the storage system 10, and stores attribute information on the corresponding distributed file.

The distributed-file identification number field 1231 of each record stores a distributed-file identification number of the corresponding distributed file.

The path name field 1232 of each record stores a path name of the corresponding distributed file. The path name is used by the computer 3 to identify, in a directory structure, the distributed file that is stored in the storage system 10.

The latest update time field 1233 of each record stores the latest update time of the corresponding distributed file. In a case where an update (data write) has been performed on the distributed file, the computer 3 requests that the metadata server 1 update the field. After receiving the request, the metadata request processing program 126 of the metadata server 1 updates the latest update time field 1223 that corresponds to the requested distributed file.

The file size field 1234 of each record stores the size of the corresponding distributed file.

The attribute field 1235 of each record stores other attributes of the corresponding distributed file. Examples of other attributes include the user who owns the distributed file, the group of the user owning the distributed file, access rights for the distributed file, a time at which the distributed file was last accessed, a time at which the attribute of the distributed file was updated, and other flags and additional information.

The summary hash field 1236 of each record stores a summary hash value of the corresponding distributed file. The summary hash value is a hash value calculated from a specific file fragment and a specific attribute of the corresponding distributed file. In this embodiment, the summary hash value is found as follows, by way of example.

$$H(\Sigma_{i \in Q} Si + size)$$

Here, Q is a set of numbers for distributed-file file fragments, H is a hash function that outputs a 32-bit hash value by obtaining an optional byte array, Si is a byte array of an ith file fragment of the distributed file, and size is data with which the size of the distributed file is expressed by a byte array. Furthermore, infix operation+indicates that byte arrays are concatenated, and $\Sigma_{i \in Q}$ Si means that the infix operation+is applied to all the Si, and the byte arrays are concatenated.

The file-fragment number set Q is predefined according to the number of file fragments.

It can be seen from FIG. 5 that information relating to the distributed file 110 is stored in the first record of the distributed file attribute table 123, for example, and that the path name of the distributed file 110 is /dir01/file01, the latest update time was 10:01 on 2009/07/02, the file size is 3,414, 336, and the summary hash value is 00f00001 (a hexadecimal integer). The contents of the attribute field 1235 are omitted.

<FIG. 6 Similar Group Table>

FIG. 6 shows an example of the similar group table 124 according to the first embodiment of the present invention.

The similar group table 124 stores records that include a group identification information field 1241, a distributed-file identification number field 1242, a group feature information field 1243, and a type field 1244. Each record corresponds to a similar group and stores similar group information.

The group identification information field 1241 of each record stores the corresponding similar group identification information. The similar group identification information is an integer that is uniquely assigned to a similar group in the present embodiment.

The distributed-file identification number field 1242 of each record stores the distributed-file identification numbers of the distributed files included in the corresponding similar group.

The group feature information field 1243 in each record stores information on features of the distributed files that are included in the corresponding similar group. A distributed-file feature is a value that is calculated from the summary hash value, the file size, other attributes, and combinations thereof, for example.

The type field 1244 in each record stores the types of the information stored in the group feature information field 1243 of the corresponding similar group.

For example, in FIG. 6, information relating to a similar group for which the group identification information is "1" is stored in the first record of the similar group table 124. It can be seen that a similar group for which the group identification information is "1" includes the distributed files 110, 220, and 330 and that a feature common to these files is that the summary hash value is 00f00001 (hexadecimal).

Figure 7:
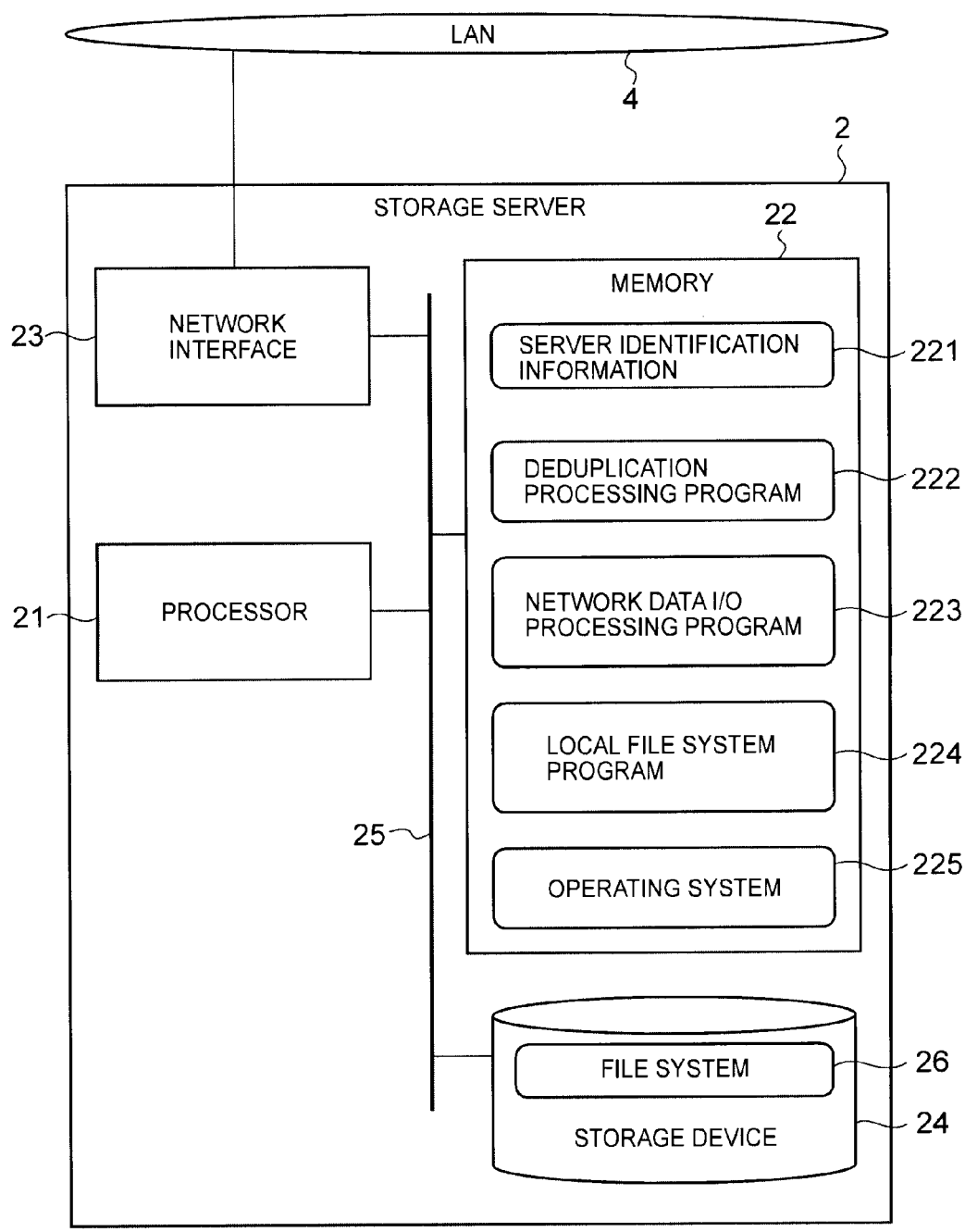
FIG. 7 shows a configuration of a storage server 2.

<FIG. 7 Storage Server>

FIG. 7 shows a configuration of the storage server 2 according to the first embodiment of the present invention.

The storage servers 2 comprise a processor 21, a memory 22, a network interface 23, and a storage device 24. These parts are connected by a bus 25.

The processor 21 executes various processing by using programs and data that are stored in the memory 22.

The network interface 23 controls inputs and outputs of data between the computer 3 and metadata server 1 via the LAN 4.

The storage device 24 comprises the file system 26 and stores programs that are executed by the storage servers 2, as well as data used by the programs.

The memory 22 stores server identification information 221. The server identification information 221 in the storage servers 2a to 2l stores identification information (A to L) identifying the storage servers 2a to 2l respectively.

Furthermore, the memory 22 stores a deduplication processing program 222, a network data I/O processing program 223, a local file system program 224, and an operating system 225.

Figure 8:
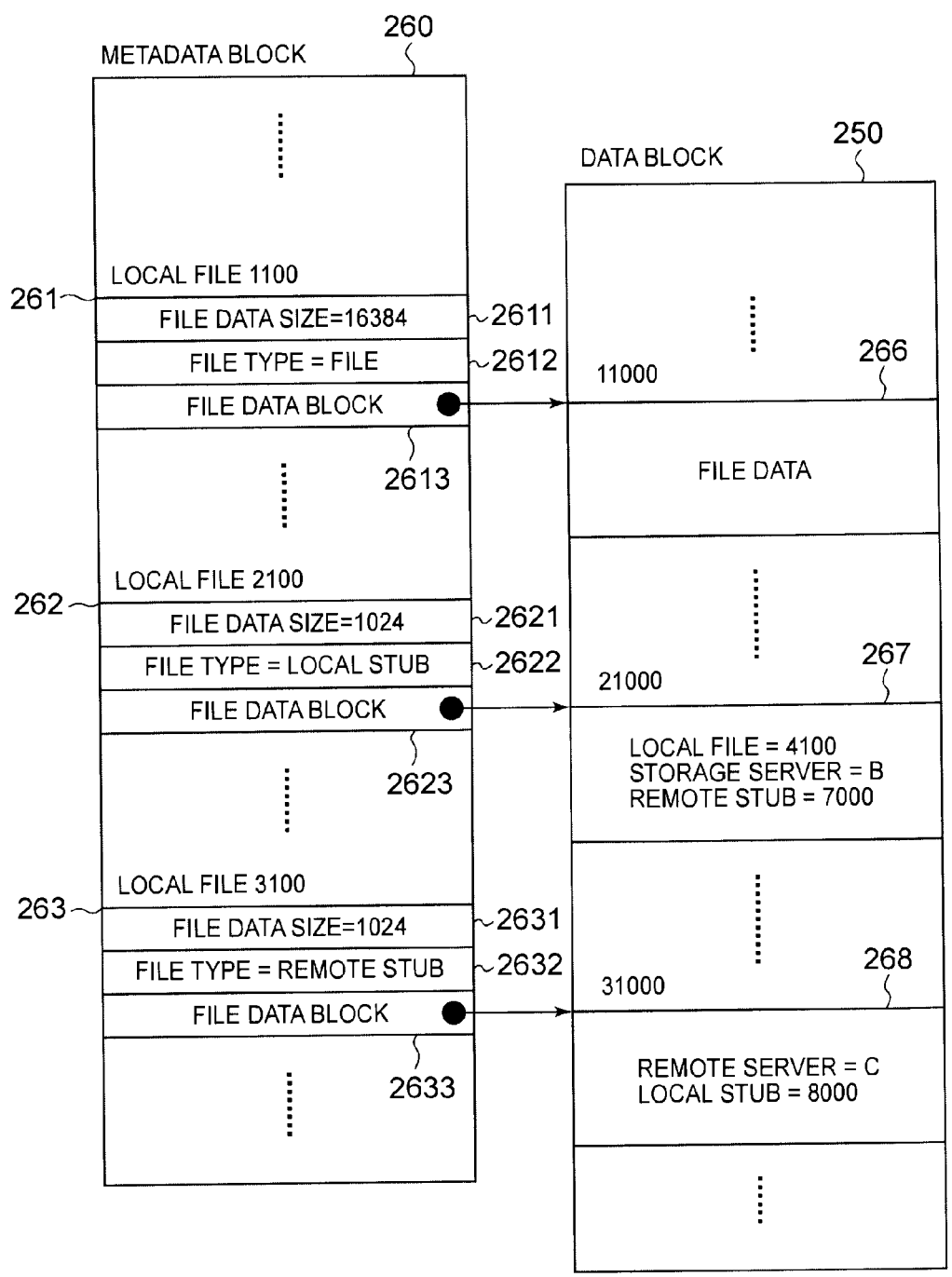
FIG. 8 shows an example of a file system 26.

<FIG. 8: File System Structure>

FIG. 8 shows an example of the file system 26 according to the first embodiment of the present invention. FIG. 8 shows the structure of the file system 26 of the storage server 2a, and stored data, by way of example. The structure of the file system 26 in each of the storage servers 2 is the same.

A file system 26a is a specific area for storing local files that is constructed in a storage device 24a. A plurality of local files can be stored in the file system 26a. A local file can be regarded as a receptacle to which data is input and which can be logically expanded or reduced. For example, if ten megabytes of data is stored in a local file, the local file is a receptacle with a 10-megabyte capacity, and if the data is erased, the local file is a receptacle with a 0-byte capacity.

A variety of attribute data called metadata can be set in a local file. If the local file is regarded as a receptacle, the metadata can be viewed as a tag that is assigned to the receptacle.

Unlike local files, the capacity of the file system 26a is fixed. Hence, if the capacity of a certain local file is reduced (the size of the stored data is reduced), the free capacity of the file system 26a increases by a proportionate amount.

The file system 26a comprises a metadata block 260 and a data block 250. The metadata block 260 stores metadata of local files that are stored in the file system 26. The data block 250 stores content of local file data. In FIG. 8, three local files (with identification numbers 1100, 2100, and 3100) are shown among the local files stored in the file system 26 of the storage servers 2a. The local file with the identification number 1100 will appear hereinafter simply as the "local file 1100".

The metadata block 260 stores metadata 261, 262, and 263, which correspond to the local files 1100, 2100, and 3100 respectively. The metadata 261, 262, and 263 each have a size field 2611, 2621, 2631, a file type field 2612, 2622, 2632, and a file data block field 2613, 2623, 2633 respectively. In addition, each of the metadata may also include a field for storing information such as a local file attribute.

In this embodiment, there are three types of local file, namely "data file", "local stub", and "remote stub". A data file stores a file fragment of a distributed file that is stored in the storage system 10. A local stub and remote stub do not store file fragments but store information referring to other local files (the identification number of the local-file file system 26, for example). A local stub includes information referring to a data file that is stored in the same storage server 2. A remote stub includes information referring to a local file that is stored in a different storage server 2.

In a case where the computer 3 issues a request to read a local stub stored in the storage server 2, the storage server 2 acquires and responds with data from the local file to which the local stub refers. Furthermore, in a case where the computer 3 issues a request to read a remote stub stored in the storage server 2, the storage server 2 responds to the computer 3 by sending an identification number of another storage server 2 and a local file to which the remote stub refers. The computer 3 re-accesses the reference-destination storage server 2 contained in the response and obtains the desired data.

As illustrated in FIG. 4, the local file 1100 stores a first file fragment of the distributed file 110. The file type field 2612 of the metadata 261 stores information indicating that the local file 1100 is a data file. The first file fragment of the distributed file 110 is stored in a storage area 266 designated by a logical block address 11000 (in the storage device 24) that is stored in the file data block field 2613.

The local file 2100 is a local stub that includes information referring to a file fragment of any distributed file that is stored in the storage system 10. A storage area 267 that is designated by a logical address 21000 that is stored in the file data block field 2623 stores information on a local file 4100 to which the local stub refers. Furthermore, in a case in which the local stub is referred to by the remote stub of another storage server 2, the storage area 267 stores identification information on the referring storage server 2 and the remote stub ("B" and "7000" in FIG. 4).

The local file 3100 is a remote stub that includes information referring to a file fragment of any distributed file stored in the storage system 10. A storage area 268 designated by a logical block address 31000 that is stored in the file data block 2633 stores a storage server 2 to which the remote stub refers ("C" in FIG. 4) and identification information on a local file ("8000" in FIG. 4) on a reference-destination storage server.

Figure 9:
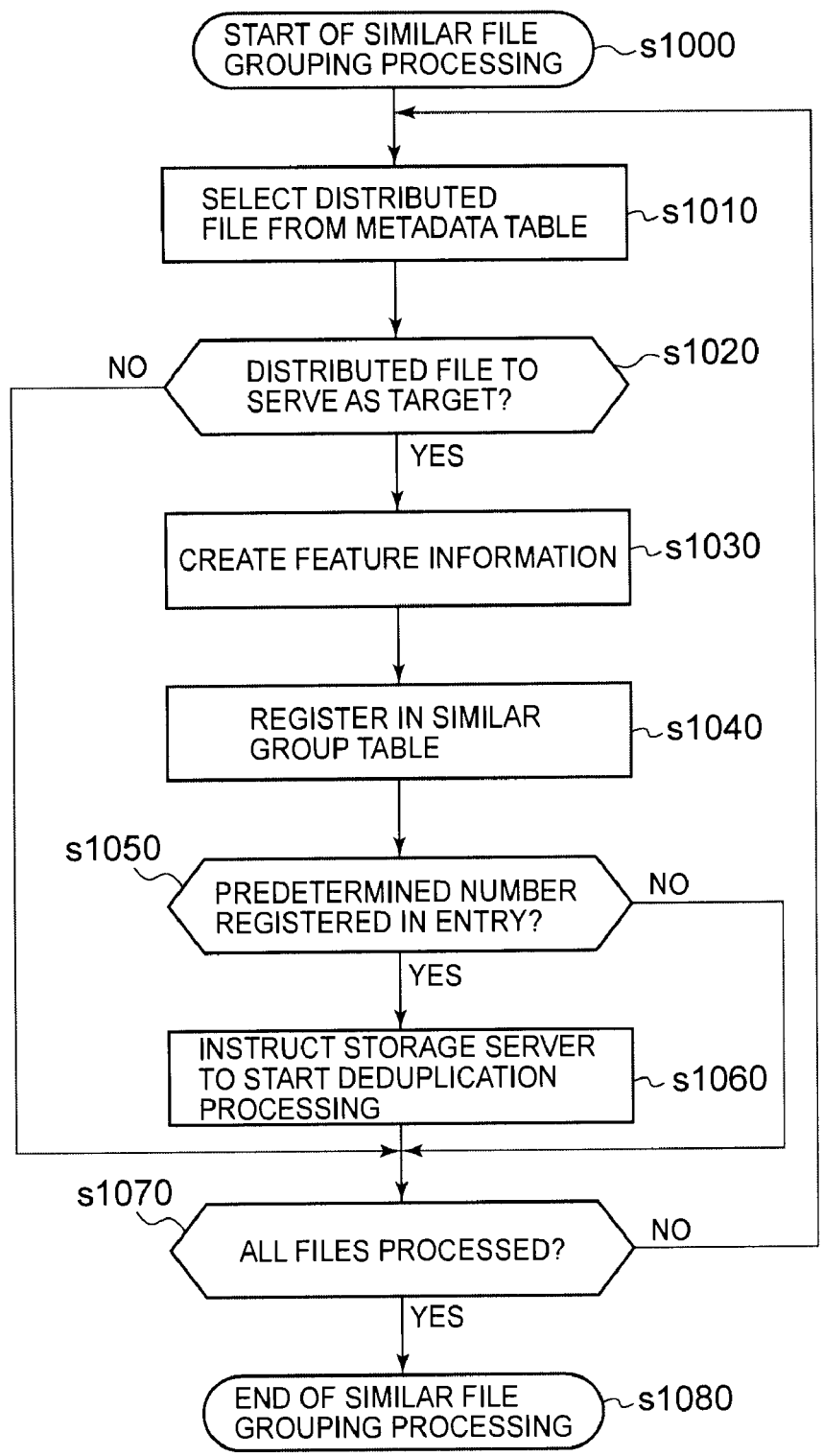
FIG. 9 is a flowchart showing an example of similar group creation processing.

<FIG. 9: Grouping Processing>

FIG. 9 is a flowchart showing an example of similar group creation processing according to the first embodiment of the present invention.

Similar group creation processing is executed at regular intervals (every day at 04:00, for example) by the similar distributed file extraction program 127 of the metadata server 1. The similar group creation processing is started from step s1000. The processing executed by the similar distributed file extraction program 127 is described hereinbelow.

In step s1010, one distributed file that is stored in the layout table 122 is selected.

In step s1020, a check is made whether the distributed file is a distributed file that is to serve as a target of deduplication processing. In precise terms, the latest update time of the selected distributed file is acquired by referring to the latest update time field 1233 of the distributed file attribute table 123, and if this latest update time has not been updated for a predetermined period (for example, one week), this time is targeted for deduplication processing.

In step s1030, if the selected distributed file is a distributed file that is to be targeted for deduplication processing, feature information of the distributed file is created. More specifically, a summary hash value for the distributed file may be created and serve as the feature information, or more simply the file size of the distributed file may serve as the feature information. Alternatively, the distributed-file feature information may be calculated using other information. The summary hash value thus created may also be stored in the summary hash field 1236 of the corresponding record in the distributed-file attribute table 123.

The distributed file feature information may be calculated by the metadata server 1, or the storage server 2 may calculate this information and supply the information to the metadata server 1 after receiving a request from the metadata server 1.

In s1040, a record that corresponds to the created feature information is selected from the similar group table 124, and an identification number of the targeted distributed file is registered in the distributed file identification number field 1242 of this record. As a result, in a case where the number of files registered in the distributed file identification number field 1242 of this record has reached a predetermined number (four, for example), the processing moves from step s1050 to s1060, and if this predetermined number is not reached, to step s1070. If a corresponding record is not stored in the similar group table 124, a new record is created.

The distributed file 440 is processed as a target and the summary hash value is 00f00001, and the distributed file 440 is registered in the distributed-file identification number field 1242 of the record of the group identification information 1.

As a result, because the number of files registered in the distributed-file identification number field of the relevant record is four, the processing advances to the next step s1060.

In step s1060, the storage servers 2 (a group of storage servers 2 will be referred to hereinafter as a storage server group), in which the distributed files included in the distributed file identification number field 1242 of the relevant record are discretely stored, are instructed to execute deduplication processing of the relevant distributed files. The IP addresses for instructing the storage servers 2 are acquired by referring to the storage server management table 121.

In this embodiment, the metadata server 1 instructs the storage server 2 with the leading file fragment of each distributed file to perform deduplication processing, the instruction then being transmitted from a storage server 2 with a former file fragment to the storage servers 2 with the second and subsequent file fragments.

The instruction from the metadata server 1 includes the following information (1) to (3).
(1) Identification information of a similar group and of distributed files included in the similar group
(2) Layout of each distributed file in (1)
(3) Information stored in the deduplication policy 125

The deduplication policy 125 stores information relating to a policy for selecting storage servers 2 from which file fragments are to be deleted in a case where distributed-file deduplication is executed. This policy involves retaining the file fragment of the storage server 2 with the smallest degree of file system utilization (capacity utilization), and deleting the file fragments of the other storage servers 2, for example. Furthermore, a policy whereby the file fragment of the storage server 2 with the smallest degree of CPU utilization is retained is also possible.

The deduplication policy 125 is registered by the administrator of the storage system 10 via a management server (not shown) or the like.

In step s1070, if all the distributed files registered in the layout table have been processed, the processing advances to step s1080 and is terminated. If not all the files have been processed, the processing returns to s1010 and another distributed file is selected and likewise processed.

Figure 10:
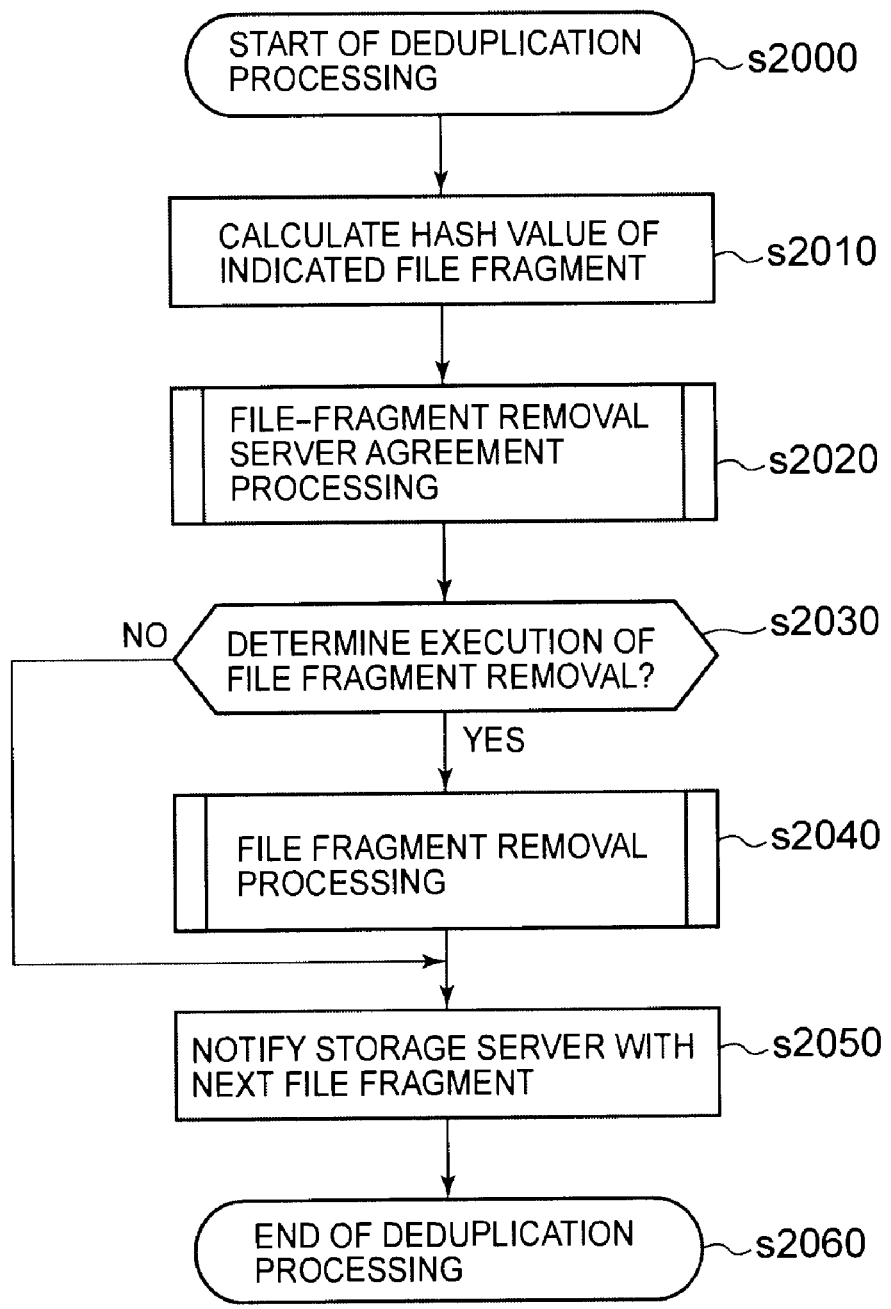
FIG. 10 is a flowchart showing an example of deduplication processing.

<FIG. 10: Deduplication Processing>

FIG. 10 is a flowchart showing an example of deduplication processing according to the first embodiment of the present invention. Deduplication processing involves each of the storage servers 2 receiving an instruction to execute deduplication processing from the metadata server 1 or the previous storage server 2, and is executed by the deduplication processing program 222. The flow of the processing of the deduplication processing program 222 will be described hereinbelow.

Deduplication processing starts from step s2000. First, after receiving an instruction from the metadata server 1, the storage server 2 takes the leading file fragment as a processing target. The storage servers 2, which store the second and subsequent file fragments of each of the distributed files, accept the numbers of the file fragments to be processed as metadata from the storage server in which the previous file fragment was stored.

In step s2010, a hash value is calculated from the content of the local file corresponding to the file fragment serving as the target of the deduplication processing. To calculate the hash value, an algorithm is used with a sufficiently large output bit number and with which conflict is suppressed, such as the SHA512 algorithm. Moreover, in order to avoid conflict, two hash values may be calculated using two or more different algorithms, and concatenated to render a hash value for the local file.

Figure 11:
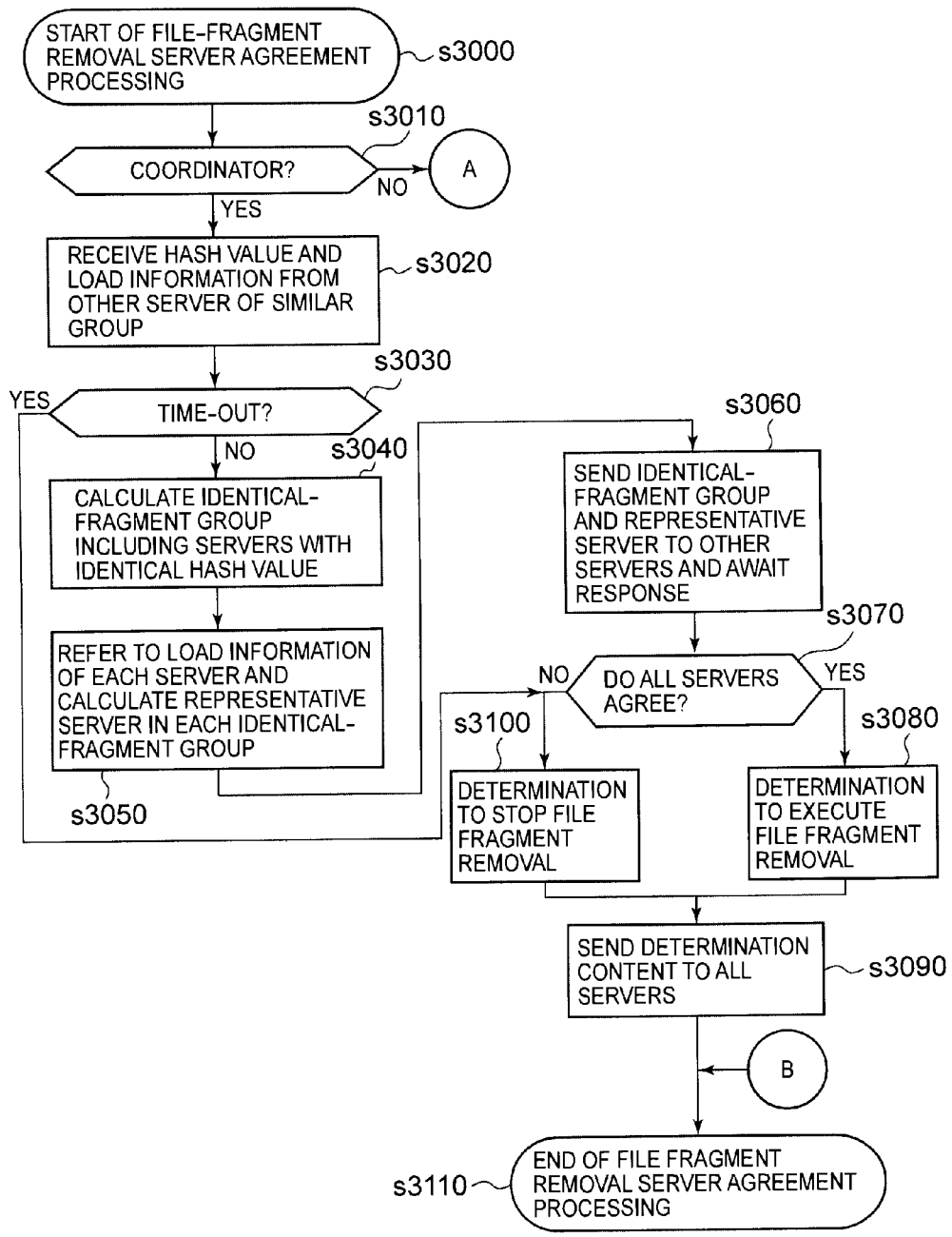
FIG. 11 is a flowchart showing an example of file-fragment removal server agreement processing.
Figure 12:
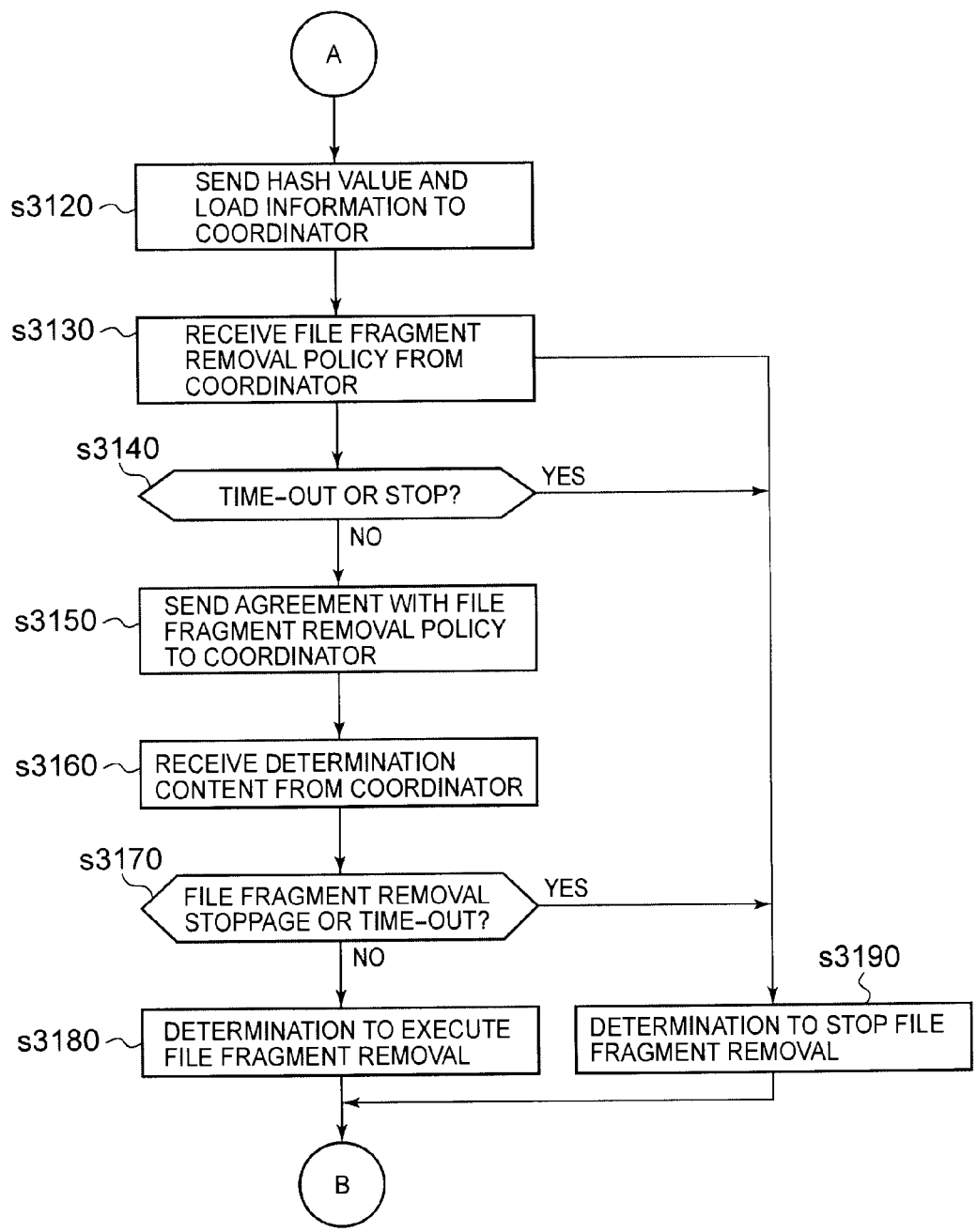
FIG. 12 is a flowchart showing an example of file-fragment removal server agreement processing.

In step s2020, storage servers 2 holding distributed files that are included in a similar group agree on which file fragments are to be removed and which file fragments are not to be removed (details on file-fragment removal server agreement processing are provided using FIGS. 11 and 12). If agreement is reached, in the decision branch of step s2030, the processing advances to step s2040 and the file fragments are processed (file fragment removal processing), whereupon the processing advances to step s2050. Otherwise, the processing advances to step s2050.

In step s2050, the storage server 2 in which the next file fragment is stored is instructed to execute deduplication processing. The instruction contains the number of the next file fragment of the file fragments processed by a self-storage server 2 as the number of the file fragment that is to be processed. Details of the file fragment removal processing are provided using FIG. 13.

<FIGS. 11 and 12: File-Fragment Removal Server Agreement Processing>

FIGS. 11 and 12 are flowcharts showing examples of the file-fragment removal server agreement processing according to the first embodiment of the present invention.

The file-fragment removal server agreement processing is executed by the deduplication processing program 222 of each storage server 2.

The file-fragment removal server agreement processing starts from step s3000.

In step s3010, judgment is made whether or not the self-storage server 2 is a coordinator. A coordinator is a storage server, among storage servers 2 that belong to a storage server group, which has a function for calculating a policy for removing file fragments and for transmitting the policy to the other storage servers 2. In this embodiment, the storage server with the latest identification information among the storage servers 2 belonging to the storage server group is the coordinator. When the self-storage server 2 is a coordinator, the processing advances to step s3020. Otherwise, the processing advances to step s3120 in FIG. 12.

In step s3020, the hash value calculated in step s2010 and storage-server load information are received from the other storage servers that belong to the storage server group. Load information includes the CPU load of the storage server, utilization of the file system 26, memory utilization, and the transitions of periods of utilization. The load information is selected according to the deduplication policy 125. For example, in this embodiment, the utilization of the file system 26 is adopted from the load information as the deduplication policy. In this case, the utilization of the file system 26 can be equalized. In a case where the CPU utilization or the memory utilization of the storage servers 2 is adopted as load information, the loads of the storage servers 2 can be equalized.

In step s3030, if a hash value is obtained from all the servers within a predetermined period (one minute, for example), the processing advances to step s3040. Otherwise, the processing advances to step S3100 and the processing is terminated.

In step s3040, among the storage servers belonging to the storage server group, those storage servers that send an identical hash value are taken as an identical-fragment group. If all the storage servers send an identical hash value, a single identical-fragment group including four storage servers is formed. Conversely, in a case in which all the storage servers send different hash values, four identical-fragment groups each including a single storage server are formed.

In step s3050, the load information and the deduplication policy are referred to for an identical-fragment group including two or more storage servers, in which a storage server 2 from which a file fragment is to be removed and a storage server 2 from which a file fragment is not to be removed are determined. Thereafter, the storage server 2 from which a file fragment is not to be removed is called the representative server of the identical-fragment group, and the storage server 2 that is not the representative server is called a dependent server.

For example, in a case where leveling of the file system utilization is set as the deduplication policy, the storage server 2 that has the lowest utilization of the file system 26 is selected as the representative server among the storage servers 2 that belong to an identical fragment group.

In step s3060, the identical-fragment group calculated in step s3040 and the representative server calculated in step s3050 are sent to the other storage servers 2 that belong to the other storage server groups, and a response is awaited.

In step s3070, if all the servers send back a response accepting the identical-fragment group and the representative server, determination is made that file fragment removal will be executed (step s3080). Otherwise, determination is made that file fragment removal will not be executed (step s3100).

In step s3090, the aforementioned determined content is sent to all the storage servers 2 that belong to the storage server group and the processing is terminated (step s3110).

In a case where the storage server 2 is not a coordinator (step s3010), the processing from step s3120 in FIG. 12 is executed.

In step s3120, the hash value calculated in step s2010 in FIG. 10 and the load information of the self storage server are sent to the coordinator.

In step s3130, the identical-fragment group and the representative server are received from the coordinator. If there is no response from the coordinator for a predetermined time (one minute, for example), or if the coordinator responds by stopping the deduplication processing, the processing advances to step s3190, whereupon determination is made that file fragment removal is not to be executed and the processing is terminated. Otherwise, the processing advances to step s3150.

In step s3150, agreement with respect to the identical-fragment group and the representative server that were sent from the coordinator is sent.

In step s3160, a decision on whether to execute or stop file fragment removal processing is received from the coordinator.

In step s3170, in a case where execution of file fragment removal is sent from the coordinator, the processing advances to step s3180, whereupon determination is made that file fragment removal will be executed and the processing is terminated. Otherwise, determination is made that file fragment removal will not be executed and the processing is terminated.

Figure 13:
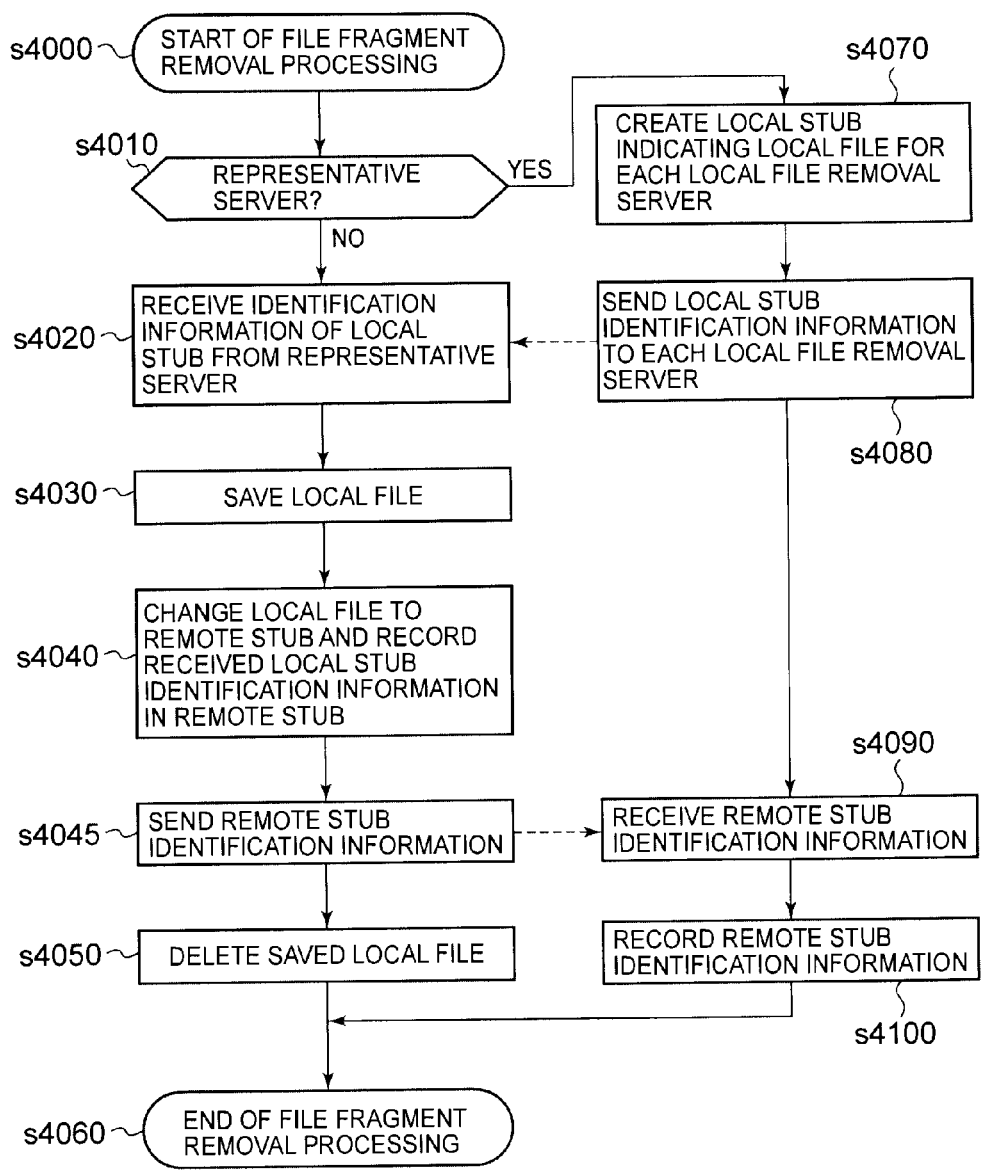
FIG. 13 is a flowchart showing an example of file fragment removal processing.

<FIG. 13: File Fragment Removal Processing>

FIG. 13 is a flowchart showing an example of file fragment removal processing according to the first embodiment of the present invention.

As illustrated in FIG. 10, in cases where all the servers decide to execute file fragment removal in the file fragment removal server agreement processing, this processing is called by step s2040.

The file fragment removal processing starts in step s4000. The file fragment removal processing is executed by the deduplication processing program 222 of the storage server 2.

In step s4010, judgment is made whether or not the self-storage server is a representative server. Notification regarding whether or not the self-storage server is a representative server is issued by the coordinator in accordance with step s3060 of the file fragment removal server agreement processing (FIG. 11). If the self-storage server is a representative server, the processing advances to step s4070, otherwise the processing advances to step s4020.

In step s4070, local stubs, which refer to local files in which target file fragments are stored, are created for the local files. The local stubs are created in the same quantity as the number of dependent servers. The local stubs each respectively store identification information of corresponding dependent servers.

In step s4080, the identification information of the local stubs created in step s4070 is sent to each of the dependent servers.

In step s4090, remote-stub identification information is received from each dependent server.

In step s4100, the remote-stub identification information received in step s4090 is recorded in a local stub that corresponds to each dependent server that was created in step s4070.

A dependent server executes processing from step s4020.

In step s4020, local-stub information is received from the representative server.

In step s4030, the local files targeted for removal are temporarily saved to a free area of the file system.

In step s4040, the local files targeted for removal are changed to remote stubs. More specifically, the file types of the local files targeted for removal (see FIG. 8) are changed to remote stubs and the file data of the local files is recorded with the representative-server identification information and the local stub identification information received from the representative server.

In step s4045, remote-stub identification information is sent to the representative server.

In step s4050, the local files that were saved in step s4030 are deleted and the processing is terminated.

Figure 14:
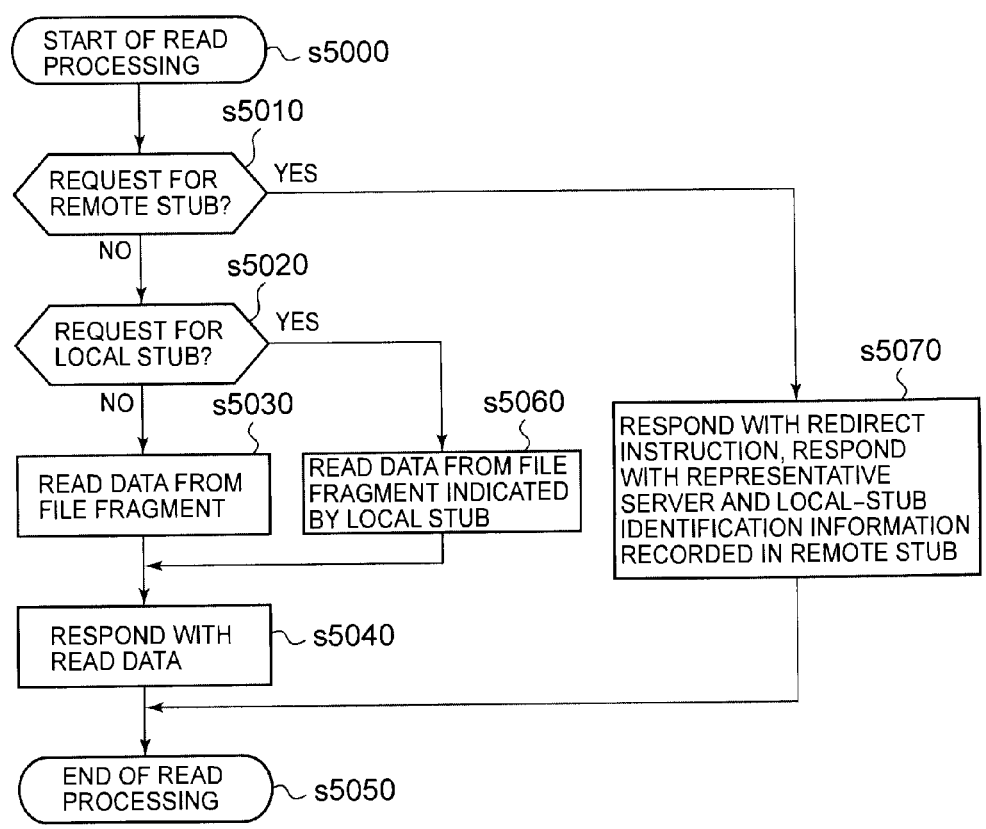
FIG. 14 is a flowchart showing an example of file read processing.

<FIG. 14: Read Processing>

FIG. 14 is a flowchart showing an example of file read processing according to the first embodiment of the present invention.

In a case where data is read from a distributed file that is stored in the storage system 10, the computer 3 first acquires the layout of the desired distributed file from the metadata server 1. The computer 3 then specifies the storage server 2 in which data is stored according to the layout, and requests that the relevant storage server 2 read the local files storing the file fragments.

The storage server 2 receives the local-file data read request from the computer 3 and starts processing from step s5000.

In step s5010, judgment is made whether or not the requested local file is a remote stub. If the local file is a remote stub, the storage server 2 sends back a response to the computer 3 that file fragments should be read from another storage server 2, and responds with representative-server identification information that is recorded in the remote stub and local-stub identification information of the representative server (step s5070). Upon receiving this response, the computer 3 re-issues a request to the appropriate storage server 2 on the basis of the response.

In step s5020, judgment is made whether or not the requested local file is a local stub. If the local file is a local stub, data is read from the local file to which the local stub refers (step s5060). Otherwise, the data is read from the relevant local file (step s5030).

In step s5040, the read data is sent back by way of response to the computer 3 and the processing is terminated (step s5050).

Figure 15:
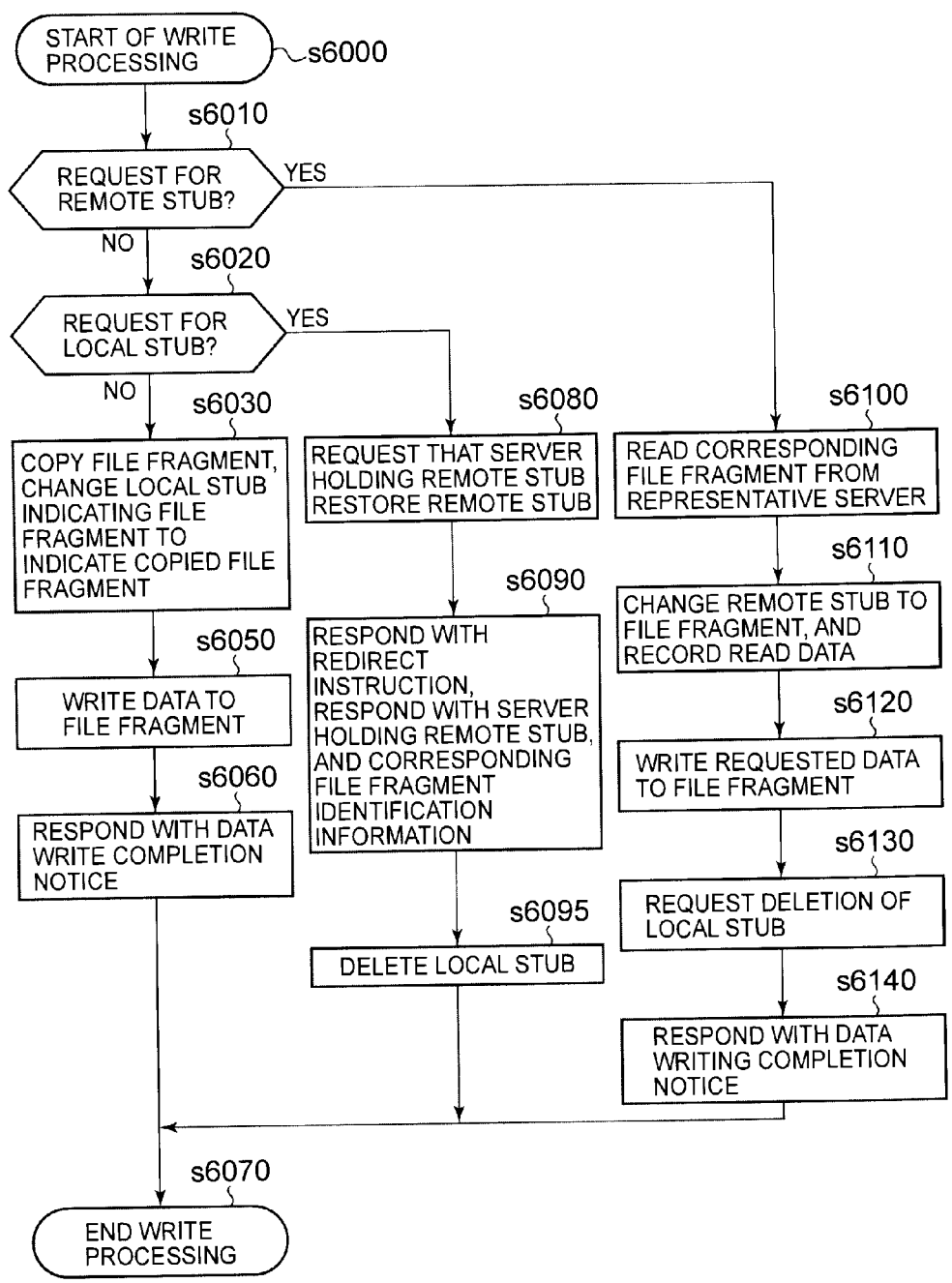
FIG. 15 is a flowchart showing an example of file write processing.

<FIG. 15: Write Processing>

FIG. 15 is a flowchart showing an example of file write processing according to the first embodiment of the present invention.

In a case where data is to be written to a distributed file that is stored in the storage system 10, the computer 3 first acquires the layout of the desired distributed file from the metadata server 1. The computer 3 then specifies the storage servers 2 in which the data is stored according to the layout, and requests that the relevant storage servers 2 write data to the local files storing the file fragments.

The storage server 2 receives the local-file data write request from the computer 3, and starts processing from step s6000.

In step s6010, judgment is made whether or not the local file requested by the computer 3 as the data write destination is a remote stub. If the local file is a remote stub, processing from step s6100, in which the remote stub is restored to a data file and data is written to the restored data file is performed.

In step s6100, file data to which the remote stub refers is read from the representative server that is the reference destination of the remote stub. As illustrated in step s4040 of FIG. 12, the remote stub refers to a local stub of the representative server. Hence, a request from the dependent server to the representative server is processed similarly to the reading of data from a local stub.

In step s6110, a metadata file type field is changed from remote stub to data file, and the data read from the representative server is written to the data file.

In step s6120, the data for which writing is requested by the computer 3 is written to the data file.

In step s6130, the representative server is requested to delete the local stub in the representative server to which the remote stub refers. The representative server deletes the requested local stub.

In step s6140, a response that data writing is complete is sent to the computer 3 and the processing is terminated.

However, in a case where the local file for which the request was received is not a remote stub in step s6010, judgment is made in step s6020 whether or not the local file requested by the computer 3 as the data write destination is a local stub. If the local file is a local stub, the dependent server referring to the local stub is requested to restore the remote stub. The dependent server referring to the local stub is recorded as local stub file data (FIG. 8). Upon receiving this request, the dependent server reads the data of the local file to which the local stub refers from the representative server, changes the metadata file type field from remote stub to data file, and writes the read data to the relevant data file.

In step s6090, a response to the effect that file fragments should be written to another storage server 2 is sent to the computer 3, the response including identification information of the dependent server that is recorded in the local stub and identification information of the data file in the dependent server. Upon receiving this response, the computer 3 re-issues the request to the appropriate storage server 2 on the basis of the response.

In step s6095, the local stub for which the request was received is deleted and the processing is terminated.

However, in step s6020, in a case where the local file for which the request was received is not a local stub (data file), processing from step s6030 is executed.

In step s6030, a data file is copied to another data file, and the local stub that refers to the source data file is changed to refer to the copied data file. However, if a local stub that refers to the data file does not exist, this processing is not executed. Identification information of the local stub that refers to the data file can be recorded as attribute information for the data file.

In step s6050, data requested by the computer 3 is written to the data file (not a duplicate).

In step s6060, a data write completion notice is sent back to the computer 3 and the processing is terminated.

Example 2

A second embodiment of the present invention will now be described using the drawings.

FIG. 16

Second Embodiment

Figure 16:
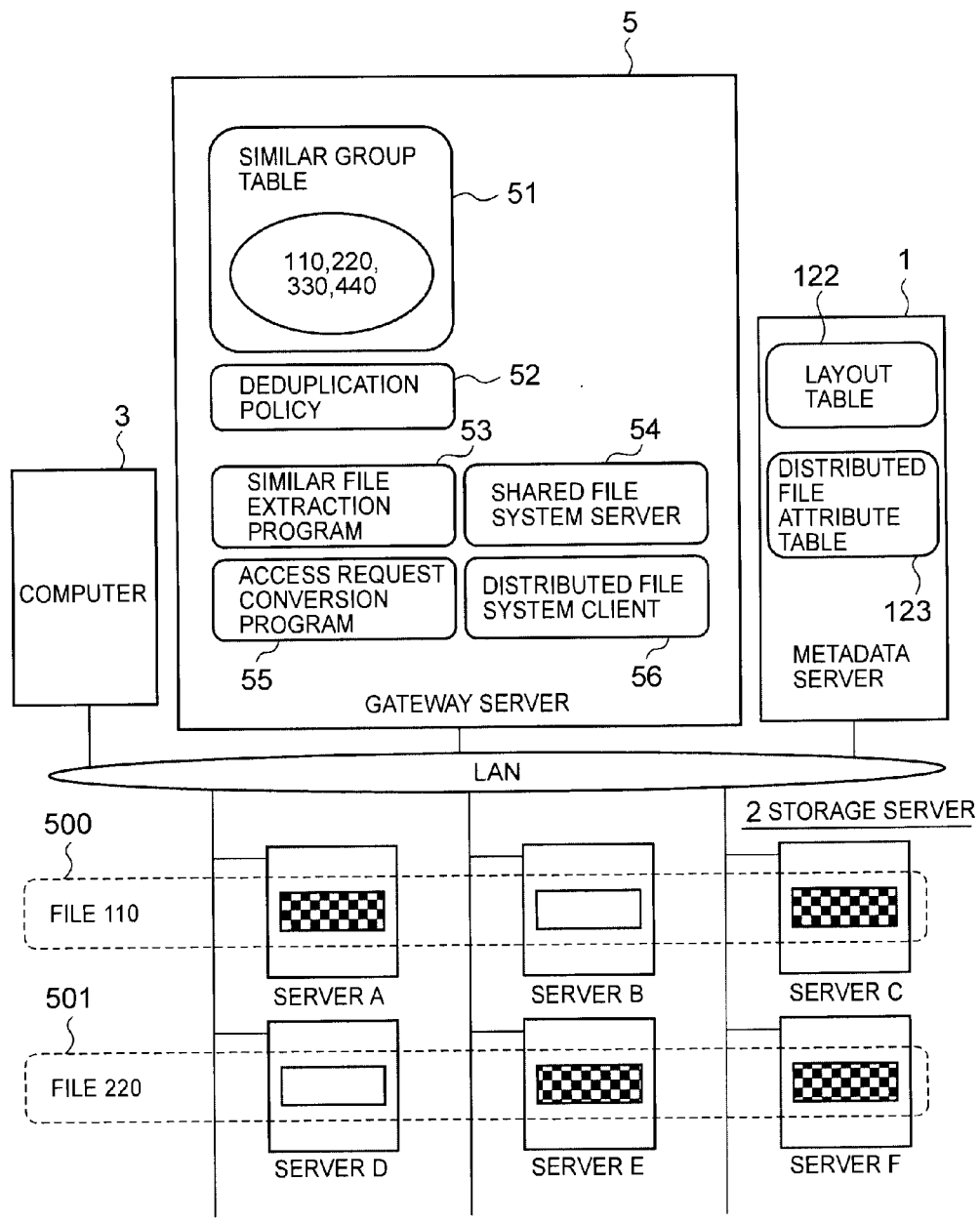
FIG. 16 provides an overview of the computer system.

FIG. 16 provides an overview of the computer system according to the second embodiment of the present invention.

The second embodiment is obtained by adding a gateway server 5 to the first embodiment.

The gateway server 5 is a computer similar to the metadata server 1 and the computer 3, and is connected to the LAN 4.

The memory of the gateway server 5 stores a shared file system server program 54, an access request conversion program 55, and a distributed file system client program 56. Each of these programs is executed by a processor of the gateway server 5.

The shared file system server program 54 receives, from the computer 3, an access request for access to the distributed file that is stored in the storage system 10. The access request is converted by the access request conversion program 55 into an access request for the distributed file system of the storage system 10, and the distributed file system client program 56 accesses the distributed file of the storage system 10 using the method described in the first embodiment.

The memory of the gateway server 5 also includes a similar group table 51, a deduplication policy 52, and a similar file extraction program 53.

The similar group table 51 is data of the same structure as the similar group table 124 in the first embodiment. In the second embodiment, the metadata server 1 does not carry the similar group table 124.

The deduplication policy 52 is data with the same structure as the deduplication policy 125 in the first embodiment. In the second embodiment, the metadata server 1 does not carry the deduplication policy 125.

The similar file extraction program 53 is a program that operates in the same way as the similar distributed file extraction program of the first embodiment. In the second embodiment, the metadata server 1 does not include the similar distributed file extraction program 127.

In the second embodiment, the similar file grouping processing is performed by the similar file extraction program 53 of the gateway server 5 rather than by the metadata server 1.

The similar file extraction program 53 performs substantially the same processing as the similar file grouping processing shown in FIG. 9, but differs in the following respect.

(1) In steps s1010 and s1020, the similar file extraction program 53 acquires the layout and attributes of the distributed files stored in the layout table 122 and distributed file attribute table 123 respectively from the metadata server 1.

(2) In step s1040, the similar file extraction program 53 stores information on similar groups in the similar group table 51.

Due to the gateway server 5 performing similar file extraction processing, the load on the metadata server 1 that is frequently accessed by the computer 3 can be reduced.

Further Embodiments

The present invention was described hereinabove on the basis of embodiments but the present invention is not limited to the above embodiments and can be applied to a variety of other aspects.

<Using L2>

For example, in the above embodiments, IP is used as the network protocol used in communications via the LAN 4 but the present invention is not limited to IP. For example, a data link protocol such as the Ethernet (registered trademark) protocol may also be used. As a result, IP address consumption can be reduced.

<Using a Plurality of LAN>

Furthermore, in the above embodiments, only a single LAN 4 is used for the communication network, but the present invention is not limited thereto. A plurality of LAN 4 may also be used, for example. As a result, the communication network can be made highly reliable.

<Performing a Data Comparison>

In addition, a hash function of a sufficiently large range is used in the above embodiments in order to examine the identity of the local files, but the present invention is not limited to this hash function. For example, the local files may be compared in small quantities at a time using a rolling hash, thereby reducing the load further. Furthermore, comparisons of local-file data bodies are not denied.

<Performing a Parity Update>

Furthermore, in the above embodiment, a function for protecting distributed files from faults is not provided, but the present invention is not limited to such a configuration. For example, in a case where a local file with parity data is provided for each distributed file and where file fragments of distributed files are updated, the parity data may be updated together, and the distributed files may be protected. Even in cases where any file fragment of the distributed file includes a local stub or remote stub, the parity data may also be updated when this stub is updated.

<Removal Policy>

Furthermore, in the above embodiments, a case is shown in which leveling of file system utilization of each of the storage servers is set as the deduplication policy, but the present invention is not limited to such a case. The following deduplication policy may also be set, for example.

(1) The CPU utilization or memory utilization of each of the storage servers 2 is leveled. In other words, priority is given to removing local files from the storage servers 2 with a high CPU utilization or memory utilization. As a result, the CPU loads of the storage servers 2 can be leveled.

(2) Files are stored according to the types of storage devices 24 each storage server 2 comprises. For example, if the storage device 24 is a high-cost, high-performance SAS (Serial Attached SCSI) disk, the removal of local files is prioritized. By removing infrequently updated files, a high-performance storage device can be used for the storage of files that are updated more frequently, and the performance of the whole storage system 10 can be improved.

<Metadata Storage Also Possible>

Furthermore, in the above embodiment, the metadata server 1 and storage servers 2 are different servers but the present invention is not limited to such a configuration. The metadata server 1 may include the functions of the storage server 2 and serve as the storage server 2. The number of devices can thus be reduced.

<Parallel Processing>

Furthermore, in the above embodiment, the metadata server 1 is configured to instruct the storage server 2 with the leading file fragment of the distributed file to execute deduplication, the deduplication instruction then being transmitted from a storage server 2 with a former file fragment to the storage servers 2 with the second and subsequent file fragments. However, the present invention is not limited to this arrangement. The metadata server 1 may also be configured to issue an instruction also to the storage servers 2 with the second and subsequent file fragments to execute deduplication. Parallel-processing the deduplication allows the time taken by deduplication processing to be shortened.

What is claimed is:

1. A method for controlling a storage system, comprising:
  splitting a data array stored in a first file into one or more fragment data arrays that include a first fragment data array;
  storing a first fragment file that includes the first fragment data array in the first storage area;
  splitting a data array stored in a second file into one or more fragment data arrays that include a second fragment data array;
  storing a second fragment file that includes the second fragment data array in the second storage area;
  creating first feature information of the first file and second feature information of the second file;
  if the first feature information corresponds to the second feature information, determining whether the first fragment data array matches the second fragment data array; and
  if the first fragment data array matches the second fragment data array, deleting the first fragment data array, and changing the first fragment file to a stub that indicates the second fragment data array,
  wherein the first feature information is an identical hash value that is calculated from one or more specific fragment data arrays among the one or more fragment data arrays that include a first fragment data array, and
  the second feature information is an identical hash value that is calculated from one or more specific fragment data arrays among the one or more fragment data arrays that include a second fragment data array.

2. The file management method according to claim 1, further comprising:
  configuring a first file system in the first storage area that stores the first fragment file; and
  configuring a second file system in the second storage area that stores the second fragment file, wherein utilization of the first file system is higher than utilization of the second file system.

3. The file management method according to claim 1, further comprising:
  in a case where a request to read data from the stub is received from a computer, responding to the computer by sending identification information of the second file server in which the second fragment data array is stored.

4. The file management method according to claim 1, further comprising:
  in a case where a request to write data to the stub is received from a computer, changing the stub to a third fragment file, storing a copy of the second fragment data array in the third fragment file, and storing the data for which writing has been requested by the computer in a third fragment data array stored in the third fragment file.

5. The file management method according to claim 1, further comprising:
  in a case where a request to write data to the second fragment file is received from a computer, copying the second fragment file to a fourth fragment file, and storing the data for which writing has been requested by the computer in the second fragment file.

6. The file management method according to claim 1, wherein the first and second files are the same size.

7. A storage system, comprising:
  a first file server having a first storage area;
  a second file server which is coupled to the first file server and which includes a second storage area;
  a metadata server coupled to the first and second file servers; and
  one or more computers coupled to the first server, the second server and the metadata server,
  wherein the computer is configured to split a data array stored in a first file into one or more fragment data arrays including a first fragment data array, and a data array stored in a second file into one or more fragment data arrays including a second fragment data array,
  wherein the first file server is configured to store a first fragment file that stores the first fragment data array in the first storage area,
  wherein the second file server is configured to store a second fragment file that stores the second fragment data array in the second storage area,
  wherein the metadata server is configured to create first feature information of the first file and second feature information of the second file, and determines whether the first fragment data array matches the second fragment data array if the first feature information corresponds to the second feature information,
  wherein if the first fragment data array matches the second fragment data array, the first file server is configured to delete the first fragment data array and change the first fragment file to a stub that indicates the second fragment data array,
  wherein the first feature information is an identical hash value that is calculated from one or more specific fragment data arrays among the one or more fragment data arrays that include a first fragment data array, and
  the second feature information is an identical hash value that is calculated from one or more specific fragment data arrays among the one or more fragment data arrays that include a second fragment data array.

8. The storage system according to claim 7, wherein
  the first file server configures a first file system in the first storage area that stores the first fragment file,
  the second file server configures a second file system in the second storage area that stores the second fragment file, and
  utilization of the first file system is higher than utilization of the second file system.

9. The storage system according to claim 7,
  wherein the first file server includes a first processor,
  the second file server includes a second processor, and
  the first processor has a higher utilization than the second processor.

10. The storage system according to claim 7,
  wherein the first file server, in a case where a request to read data from the stub is received from the computer, responds to the computer by sending identification information of the second file server in which the second fragment data array is stored.

11. The storage system according to claim 7, wherein the first file server, in a case where a request to write data to the stub is received from the computer, changes the stub to a third fragment file, stores a copy of the second fragment data array in the third fragment file, and stores the data for which writing has been requested by the computer in a third fragment data array stored in the third fragment file.

12. The storage system according to claim 7, wherein the second file server, in a case where a request to write data to the second fragment file is received from the computer, copies the second fragment file to a fourth fragment file, and stores the data for which writing has been requested by the computer in the second fragment file.

13. The storage system according to claim 7, wherein the first and second files are the same size.

* * * * *